United States Patent [19]
Foye

[11] Patent Number: 6,033,129
[45] Date of Patent: Mar. 7, 2000

[54] CAMERA MOUNTING PLATE AND LOCK

[75] Inventor: Richard T. Foye, Fullerton, Calif.

[73] Assignee: Multiplex Technologies, Inc., Brea, Calif.

[21] Appl. No.: 09/120,390

[22] Filed: Jul. 21, 1998

[51] Int. Cl.⁷ .................................................. G03B 17/00
[52] U.S. Cl. ............................................................ 396/427
[58] Field of Search ................................... 396/419, 427; 348/143, 151

[56]         References Cited

U.S. PATENT DOCUMENTS

| | | | |
|---|---|---|---|
| 4,709,897 | 12/1987 | Meoney | 248/551 |
| 4,881,135 | 11/1989 | Heilweil | 358/335 |
| 4,963,962 | 10/1990 | Kruegle et al. | 358/108 |
| 5,032,856 | 7/1991 | McMinn | 354/81 |

*Primary Examiner*—Howard B. Blankenship
*Attorney, Agent, or Firm*—Lynn & Lynn

[57]           ABSTRACT

A mounting plate and locking key are arranged to mount a camera lens housing to a faceplate. The lens housing extends through a hole in the mounting plate so that an end of the lens housing is aligned with a hole in the faceplate. The mounting plate is a thin, elongate rectangle having a raised central portion and a pair of support members extending in opposite directions therefrom. The locking key is a thin elongate rectangle having a generally U-shaped opening formed in one end. The locking key is inserted between the faceplate and the raised central portion of the mounting plate. The U-shaped opening is then in alignment with the hole in the mounting plate so that edges of the U-shaped opening are engaged with the lens housing. Fastening apparatus retains the lens housing within the central passage of the mounting key by pressing the mounting plate against the faceplate, which holds the mounting plate against the locking key to retain the locking key in engagement with the lens housing and compresses the outer end of the lens housing against the faceplate at the edges of the faceplate opening.

4 Claims, 3 Drawing Sheets

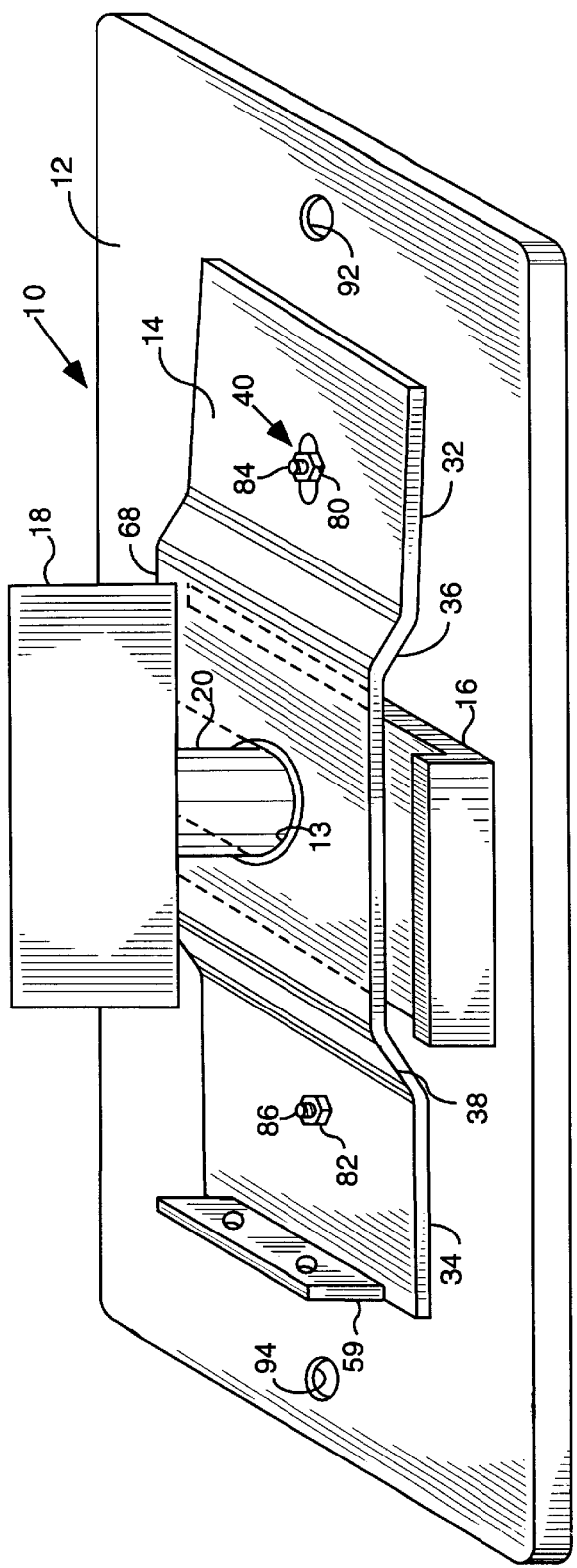
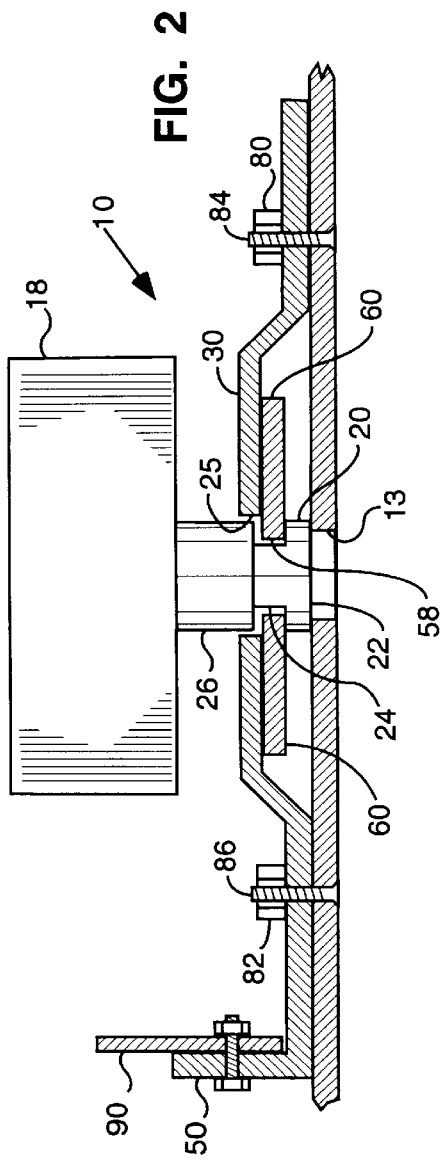
FIG. 1
FIG. 2

CAMERA MOUNTING PLATE AND LOCK

BACKGROUND OF THE INVENTION

This invention relates generally to mounting devices for surveillance cameras. This invention relates particularly to apparatus for mounting a surveillance camera to the inner side of a junction box cover plate to conceal the camera in a wall.

Surveillance cameras suitable for mounting in a typical electrical junction box are commercially available. These surveillance cameras use solid state electronic components mounted on printed circuit boards. The printed circuit boards provide interfaces between the cameras and power supply wiring and coaxial cable used to direct signals from the cameras to display devices.

A problem with installing such cameras arises because they have little in common mechanically. The printed circuit board size often varies from one camera to another, and there is no standard arrangement of mounting holes. The variation in camera construction and dimensions makes installation expensive and inconvenient.

SUMMARY OF THE INVENTION

The present invention provides a camera mounting device and method that overcome the problems associated with mounting cameras of various dimensions in a wall. Apparatus according to the present invention for mounting a camera having a lens housing formed as a stepped cylinder to a faceplate having a faceplate opening arranged for alignment with the lens housing comprises a mounting plate and a locking key. The mounting plate is formed generally as a thin, elongate rectangle having a raised central portion and a pair of support members extending in opposite directions from the raised central portion. The raised central portion has a central passage therein formed so that an outer end of the lens housing may be arranged to extend through the central passage.

The locking key is formed generally as a thin elongate rectangle having a generally U-shaped opening formed in one end thereof. The locking key is formed so that it may be inserted between the faceplate and the raised central portion of the mounting plate. The U-shaped opening is then in alignment with the central passage in the mounting plate with edges of the U-shaped opening being engaged with a shoulder formed in the lens housing at the intersection of a narrowed diameter portion of the lens housing with a larger diameter portion.

Fastening apparatus is provided for retaining the lens housing within the central passage of the mounting key by pressing the mounting plate against the faceplate. This holds the mounting plate against the locking key to retain the locking key in engagement with the shoulder of the lens housing and compresses an outer end of the lens housing against the faceplate at the edges of the faceplate opening.

The camera mounting apparatus further comprises a locking projection extending from the raised central portion of the mounting plate and a locking hole formed in the locking plate. The locking projection and the locking hole are arranged so that the locking projection extends into the locking hole when the locking plate is arranged to retain the lens housing in the central passage of the mounting plate.

An appreciation of the objectives of the present invention and a more complete understanding of its structure and method of operation may be had by studying the following description of the preferred embodiment and by referring to the accompanying drawings.

BRIEF DESCRIPTION OF THE DRAWING

FIG. 1 is a perspective view of a camera mounting device being used to mount a camera to the rear side of a junction box faceplate;

FIG. 2 is a side elevation view of the apparatus of FIG. 1 showing a typical lens assembly structure for a surveillance camera;

DESCRIPTION OF THE PREFERRED EMBODIMENT

Figure 3:
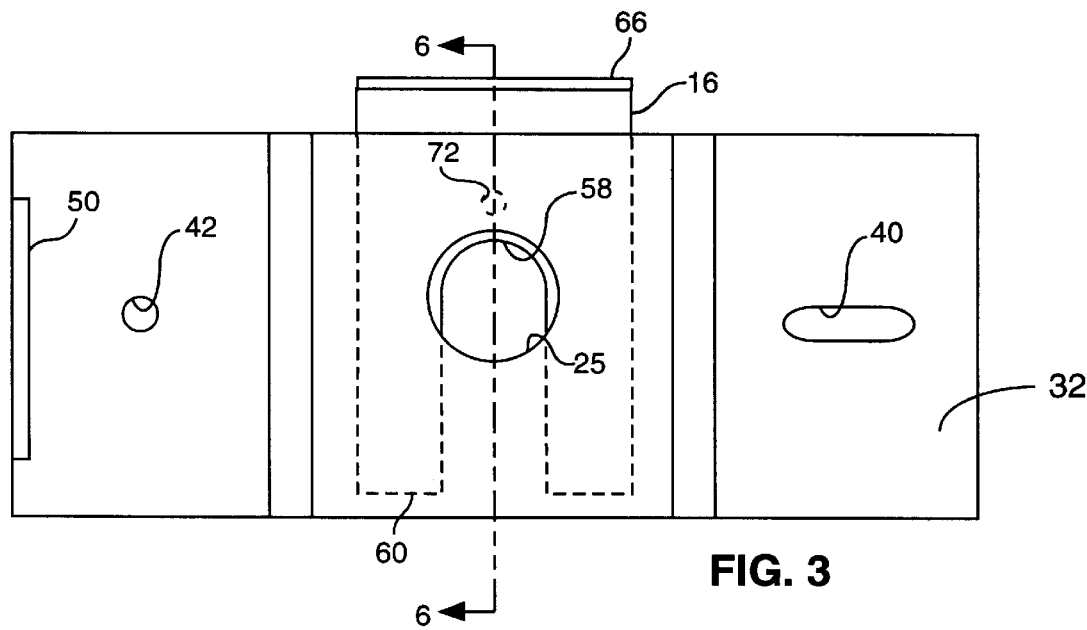
FIG. 3 is a plan view of the camera mounting device of FIG. 1.
Figure 4:
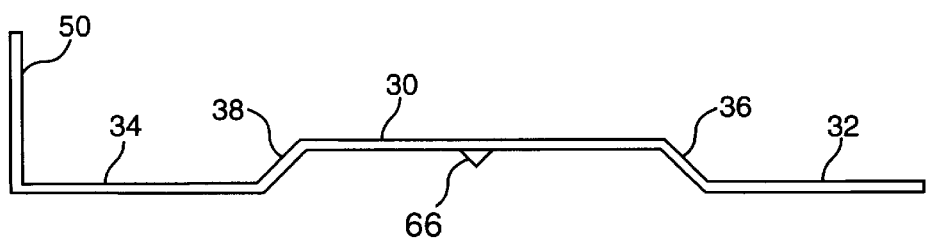
FIG. 4 is an elevation view showing a mounting plate that may be included in the camera mounting device of FIG. 1.

As shown in FIG. 1 a camera mounting system 10 includes a faceplate 12, a mounting plate 14 and a locking key 16. The camera mounting system 10 is used to mount a camera 18 to the faceplate 12, which is a generally rectangular plate having a central passage 13 therein. The passage 13 typically has a diameter of about 0.38 inch. The faceplate 12 is then mounted to a junction box (not shown) or the like that is placed inside a wall, for example, so that the camera 18 has a field of view covering a selected area without being obtrusive or readily noticeable by a casual observer. The camera mounting system 10 is suitable for commercial and residential applications where a surveillance camera is to be used.

Although there is considerable variation in camera structures, most cameras designed for such applications have similar lens assemblies. Referring to FIG. 2, the typical camera 18 has a lens housing 20 having an end portion 22 that has a diameter of about 14 mm (0.55"). The lens housing 20 terminates in a threaded cylindrical body 24 of diameter smaller than the 14 mm diameter end portion 22. The threaded body 24 is connected to a lens mount 26 that extends from the camera 18. Therefore, as best shown in FIGS. 2 and 3, the lens housing portion 22, the threaded cylindrical body 22 and the lens mount 26 form a stepped cylindrical configuration.

Referring to FIGS. 1–4, the mounting plate 16 is preferably formed of a thin sheet of metal such as steel. In a preferred embodiment of the invention, the mounting plate has a thickness of about 0.03".

Figure 5:
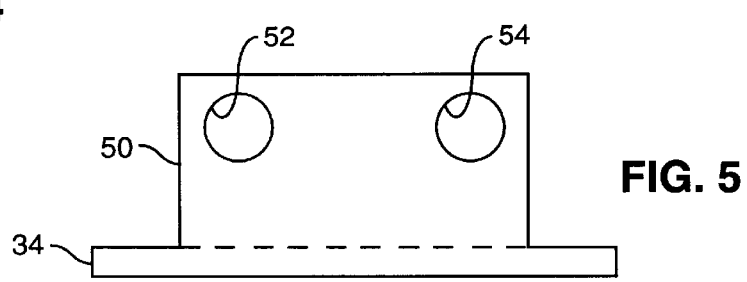
FIG. 5 is an end elevation view of the mounting plate of FIG. 4.
Figure 6:
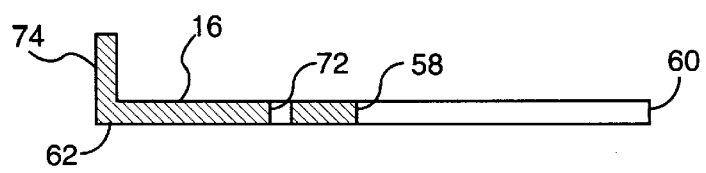
FIG. 6 is a cross sectional view along line 6—6 of FIG. 3. of a locking key included in the camera mounting device of FIGS. 1 and 2.

As best shown in FIGS. 1, 2 and 5, the mounting plate 14 has a generally planar raised central portion 30 that preferably is formed generally as a square having sides of about one inch. The central passage 13 in the central portion 30 has a diameter that is slightly larger than the diameter of the lens housing 20. In a preferred embodiment the diameter of the central passage 13 is about 0.56".

A pair of support members 32 and 34 extend from opposite sides of the central portion 30. The support members 32 and 34 preferably are also generally planar. The support members 32 and 34 are preferably connected to the central portion 30 by angled transition sections 36 and 38, respectively, that make angles of about 45° with the central portion 30 and with each of the support members 32 and 34. The support members 32 and 34 include mounting holes 40 and 42, respectively, where nuts and bolts are used to fasten the mounting plate 30 to the faceplate 12. The mounting hole 42 preferably is elongated with a width of about 0.156 inch and a length of about 0.312 inch. The mounting hole 40 may be generally circular with a diameter of about 0.156 inch. When the nuts are tightened on their respective bolts, the central portion 30 is drawn toward the faceplate. The elongate hole 42 allows the support member 34 to slide relative to the faceplate 12 as the nut is tightened, which allows the central portion 30 of the mounting plate to be drawn toward the faceplate 12 without distortion.

As shown in FIGS. 1, 2, 4 and 5, a bracket 50 extends from the outer end of the support member 34. The bracket 50 includes mounting holes 52 and 54 formed for mounting a circuit board (not shown) that typically is included with the camera 18.

Referring to FIGS. 1–3, the locking key 16 is formed generally as a thin rectangular plate having a "U" shaped recess 58 in and end 60 thereof. The width of the locking key is slightly less than the length of the central portion 30 of the mounting plate. In a preferred embodiment of the invention the locking key has a width of about 0.78". The curved portion of the recess 58 is preferably a semicircle having a diameter of about 0.48". The support members of the recess 58 preferably have lengths of about 0.50". The overall length of the locking key is about 1.3".

The end 62 of the locking key 16 preferably has an upturned portion 64 that preferably has a width of about 0.23". This upturned portion 64 facilitates assembly of the mounting device 10 by providing a convenient place for a person to grasp the locking key and insert in position to retain the lens assembly a desired position.

The mounting plate 14 preferably includes a projection 66 located centrally along its length and offset from an edge 68 by about 0.1". The projection 66 preferably extends about 0.02" from the lower surface 70 of the mounting plate 14. The projection 66 preferably has a diameter of about 0.06". The locking key 16 has an opening 72 that is aligned with the longitudinal axis of the recess 58 and offset from the inner end 74 thereof. When the locking key is placed in position to mount the camera 18 to the faceplate 12, the projection 66 extends into the opening 72.

The locking key may also have an outwardly extending lip 74 at the end 76 opposite from the U-shaped opening 58. The lip 74 facilitates grasping the locking plate.

Now that the structures of the components of the lens mounting system and the structure of a typical lens housing have been described, the method of operation of the invention may be seen from FIGS. 1, and 3–5. The lens housing 20 is inserted into the opening 13 in the mounting plate 14 so that the shoulder defined by the interface of the portion 20 with the reduced diameter portion extend beyond the surface of the mounting plate 14. The locking key 16 is then arranged generally perpendicular to the length of the mounting plate 14. The locking key 16 is then moved toward the lens housing 20 so that the threaded portion is inside the U-shaped recess 58 with the locking key being placed between the mounting plate 14 and the edge of the lens housing 20. The spacing between the support members of the U-shaped recess 58 is greater than the diameter of the threaded portion 24 but less than the diameter of the lens housing 20. Therefore, with the locking key 16 is arranged as just described, the lens housing 20 cannot be withdrawn from the opening 13. Nuts 80 and 82 are then tightened on their respective bolts 84 and 86 to press the end of the lens housing 20 against the inner surface of the faceplate 12. The locking key 16 is also held in compression between the surface of the mounting plate 14 and the edge of the lens housing 20, which when combined with the engagement of the projection 66 with the opening 72 prevents the locking key 16 form being withdrawn from engagement with the camera 18 and mounting plate 14.

As shown in FIG. 2, a printed circuit board 90 may then be mounted to the bracket 50, and appropriate electrical connections (not shown) may be made to provide electrical power and video output for the camera 18.

The faceplate 12 is then ready for mounting to a junction box (not shown) or the like in a well-known manner using screws (not shown) placed through screw openings 92 and 94 in the faceplate 12.

Figure 7:
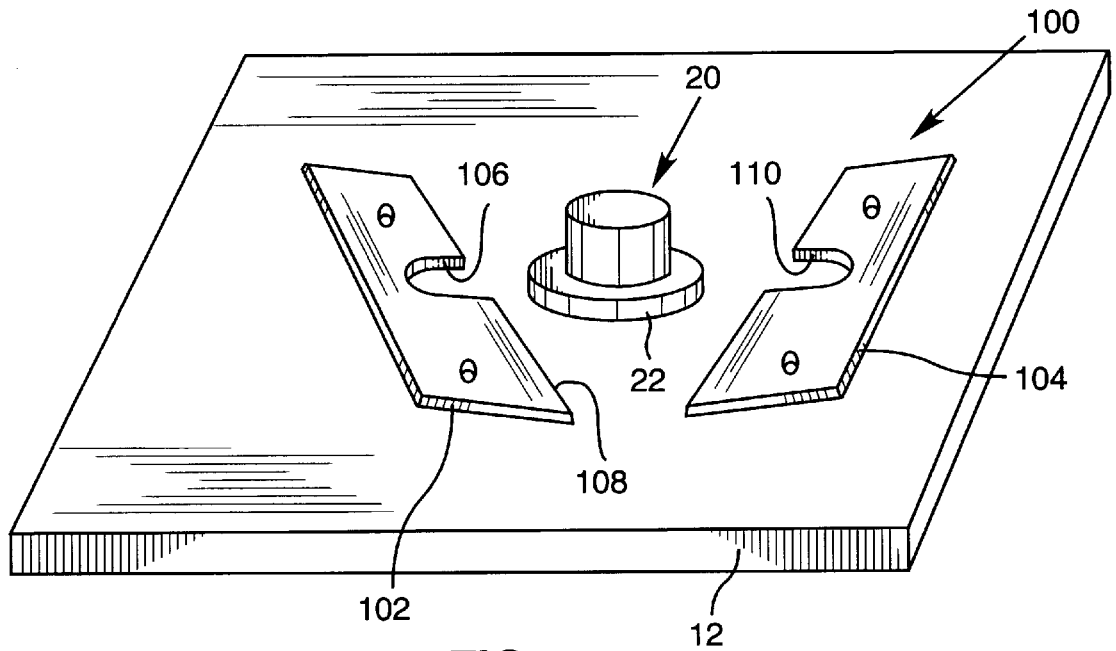
FIG. 7 is a perspective view of a second embodiment of a camera mounting device according to the present invention.

FIG. 7 illustrates a second embodiment of the invention. A camera mounting device 100 includes a pair of plates 102 and 104. The plate 102 has a channel 106 formed in a side 108. The channel 106 preferably has a "U" or semicircular configuration. The plate 104 has a channel 110 formed therein and is preferably substantially identical to the plate 102. The channels 106 and 110 are formed so that the plates 102 and 104 may be placed on opposite sides of the lens housing 20. The channels 106 and 110 have dimensions such that the small diameter portion 24 fits within them with the larger diameter end portion 22 being retained against the faceplate 12. The plates 102 and 104 have holes 112a–112d arranged so that suitable screws (not shown) may be used to retain the plates 102 and 104 and the end 22 of the lens housing in selected positions on the faceplate 12.

Figure 8:
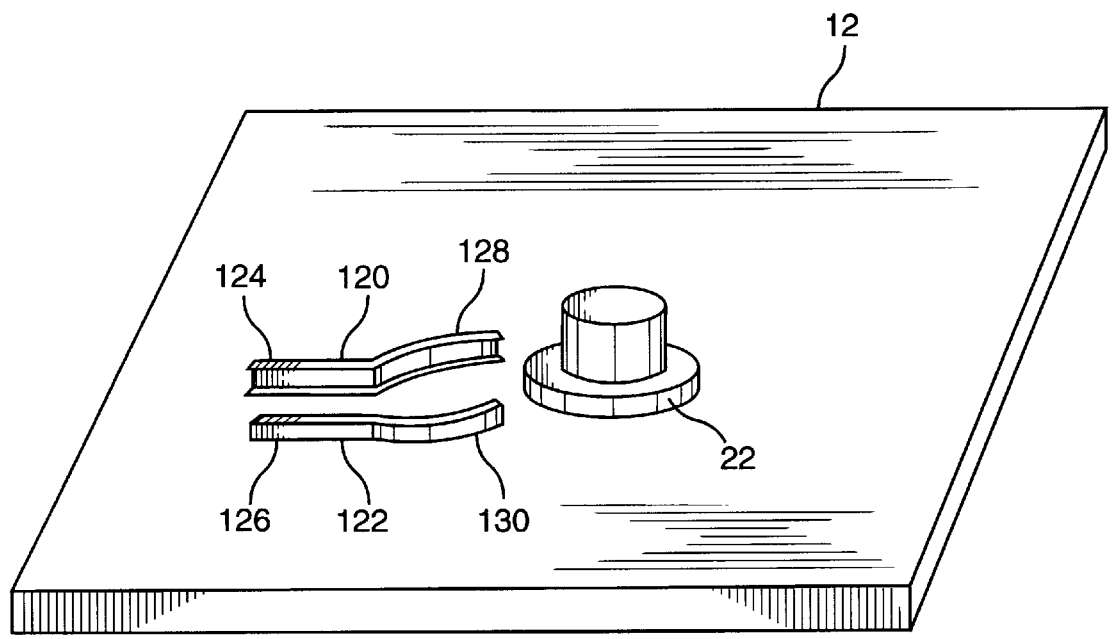
FIG. 8 is a perspective view of a third embodiment of a camera mounting device according to the present invention.

FIG. 8 illustrates a third embodiment of the invention. A pair of substantially identical brackets 120 and 122 have end portions 124 and 126, respectively, mounted to the faceplate 12. The brackets 120 and 122 are flexible and have end portions 128 and 130, respectively, that may be displaced laterally from one another while the end portions 124 and 126 are mounted to the faceplate 12. The brackets 120 and 122 have facing channels 132 configured such that the larger diameter end 22 of the lens assembly 20 may be inserted in the channels 132 when the ends 128 and 130 are laterally displaced. After the end 22 of the lens housing 20 is inserted between the ends 128 and 130 of the brackets 120 and 122, respectively, elastic forces in the brackets retain the lens housing 20 in a selected position in relation to the faceplate 12.

Exemplary embodiments of the invention are described herein to explain how to make and use the invention. In actual practice, modifications may be made within the scope and spirit of the invention. The described embodiments are to be considered in all respects as exemplary and illustrative rather than restrictive. Therefore, the appended claims rather than the foregoing descriptions define the scope of the invention. All modifications to the embodiments described herein that come within the meaning and ranges of equivalence of the claims are embraced within the scope of the invention.

What is claimed is:

1. Apparatus for mounting a camera having a lens housing formed as a stepped cylinder to a faceplate having a faceplate opening arranged for alignment with the lens housing, comprising:

a mounting plate formed generally as a thin, elongate rectangle having a raised central portion and a pair of support members extending in opposite directions from the raised central portion, the raised central portion having a central passage therein formed so that an outer end of the lens housing may be arranged to extend therethrough;

a locking key formed generally as a thin elongate rectangle having a generally U-shaped opening formed in one end thereof, the locking key being formed so that it may be inserted between the faceplate and the raised central portion of the mounting plate with the U-shaped opening in alignment with the central passage in the mounting plate with edges of the U-shaped opening being engaged with a shoulder formed in the lens housing at the intersection of a narrowed diameter portion of the lens housing with a larger diameter portion; and fastening apparatus for retaining the lens housing within the central passage of the mounting key by pressing the mounting plate against the faceplate to hold mounting plate against the locking key to retain the locking key in engagement with the shoulder of the lens housing and compress an outer end of the lens housing against the faceplate at the edges of the faceplate opening.

2. The apparatus of claim 1, further comprising a locking projection extending from the raised central portion of the mounting plate and a locking hole formed in the locking plate, the locking projection and the locking hole being arranged so that the locking projection extends into the locking hole when the locking plate is arranged to retain the lens housing in the central passage of the mounting plate.

3. The apparatus of claim 1 wherein the fastening apparatus includes an elongate opening in one of the support members of the mounting plate and a nut and bolt combination arranged so that the mounting plate may move lengthwise relative to the faceplate as the nut is tightened on the bolt to move the raised central portion of the mounting plate toward the faceplate.

4. The apparatus of claim 1 wherein the mounting plate includes a bracket that extends outwardly from one of the support members to provide apparatus for mounting electrical circuitry associated with the camera to the mounting plate.

* * * * *